(12) United States Patent
Grier et al.

(10) Patent No.: US 12,709,121 B2
(45) Date of Patent: Aug. 18, 2026

(54) DYNAMIC ROTARY INFLATION SYSTEM

(71) Applicant: Airgo IP, LLC, Oklahoma City, OK (US)

(72) Inventors: Elliott Grier, Apple Valley, MN (US); Peter Jankowski, Edmond, OK (US); Adwait Kulkarni, Oklahoma City, OK (US)

(73) Assignee: Airgo IP, LLC, Oklahoma City, OK (US)

( * ) Notice: Subject to any disclaimer, the term of this patent is extended or adjusted under 35 U.S.C. 154(b) by 796 days.

(21) Appl. No.: 17/977,636

(22) Filed: Oct. 31, 2022

(65) Prior Publication Data

US 2024/0140144 A1 May 2, 2024

(51) Int. Cl.
*B60C 23/00* (2006.01)

(52) U.S. Cl.
CPC .. *B60C 23/00318* (2020.05); *B60C 23/00327* (2020.05)

(58) Field of Classification Search
CPC ........ B60C 23/00318; B60C 23/00327; B60C 23/00345
See application file for complete search history.

(56) References Cited

U.S. PATENT DOCUMENTS 4,418,737 A 12/1983 Goodell et al.
5,309,969 A * 5/1994 Mittal .............. B60C 23/00354 137/224.5
5,313,995 A * 5/1994 Schultz ............ B60C 23/00363 152/416
6,250,327 B1 * 6/2001 Freigang .......... B60C 23/00372 137/513.5
6,457,502 B1 10/2002 Bell et al.
8,973,633 B2 3/2015 Wilson et al.
9,132,704 B2 9/2015 Wilson et al.
9,415,645 B2 * 8/2016 Racine ............. B60C 23/00318
9,718,319 B2 * 8/2017 Knepple .............. B60C 29/002
9,925,835 B1 3/2018 Stech et al.
10,556,469 B2 2/2020 Foor et al.
10,562,357 B2 2/2020 Burke et al.
10,576,794 B2 * 3/2020 Lee .................. B60C 23/00354
10,647,169 B1 5/2020 Castriotta et al.
10,696,106 B2 6/2020 Hennig
10,933,703 B2 3/2021 Hennig et al.

* cited by examiner

*Primary Examiner* — Jason R Bellinger
(74) *Attorney, Agent, or Firm* — Hall Estill Law Firm

(57) ABSTRACT

Method and apparatus for dynamic inflation control in a vehicle rotary environment. A supply conduit supplies pressurized fluid from a source to a hub assembly having a rotary union and a hub, with the supply conduit passing through the rotary union to the hub. The hub includes a diaphragm disposed between the supply conduit and a lead conduit coupled to an inflatable member. The diaphragm is normally biased against a sealing surface using a biasing mechanism, such as a spring. The biasing mechanism facilitates selective bi-directional fluid flow between the supply conduit and the lead conduit during inflation and deflation of the inflatable member. A supply reservoir and at least one condensation recess may be placed adjacent the diaphragm. The rotary union may be coupled to the hub using a pin and a circumferentially extending slot.

20 Claims, 5 Drawing Sheets

DYNAMIC ROTARY INFLATION SYSTEM

SUMMARY

In accordance with some embodiments, inflation system has a supply conduit passing through a rotary union to a hub. The hub consists of a diaphragm contacting a force mechanism with the diaphragm separating the supply conduit from a lead conduit. The force mechanism selectively allows bi-directional fluid flow between the supply conduit and the lead conduit in response to fluid pressure that differs from a predetermined threshold pressure.

Other embodiments involve connecting a first tire to a hub via a lead conduit before setting the hub to a first threshold pressure. A supply conduit is pressurized to a predetermined fluid pressure with the supply conduit passing through a rotary union to the hub. The supply conduit is separated from the lead conduit by a diaphragm that physically moves to allow bi-directional fluid flow. In response to fluid pressure in a tire dropping below a first threshold pressure, fluid flows from the supply conduit to the tire once physically moves. In response to fluid pressure in the tire elevating above the first threshold pressure, the diaphragm physically moves to allow fluid to flow from the tire to the supply conduit via the lead conduit.

These and other features which may characterize various embodiments can be understood in view of the following detailed discussion and the accompanying drawings.

DETAILED DESCRIPTION

Various embodiments of the present disclosure are generally directed to inflation systems for rotary environments that efficiently maintain a predetermined pressure in at least one inflatable member.

As vehicle technology evolves, greater efficiency, performance, and reliability can be provided. Advancements in tire and other inflatable aspects of a vehicle have enabled longer vehicle ranges and greater fuel mileage. However, the proper maintenance of such inflatable aspects over time is imperative to provide the operational benefits instead of degrading the efficiency and reliability of vehicle components. For instance, maintaining an ideal tire pressure over time can increase fuel efficiency while operating with too much, or too little, tire pressure can decrease fuel efficiency, increase the rate of tire material wear, and impact vehicle dynamics, such as handling and braking performance. Hence, there is a continued industry goal for systems to intelligently and reliably maintain air pressure in assorted inflatable aspects of a vehicle.

Accordingly, embodiments are directed to an inflation system that employs bi-directional airflow to maintain air pressure in one or more inflatable aspects of a vehicle, such as a car, truck, trailer, or dolly. Passage of bi-directional airflow through a rotary union can maintain a desired pressure in one or more inflatable members while the members are in motion, encountering dynamic environmental conditions, and experiencing different amounts of wear. As a non-limiting example, an inflation system arranged in accordance with some embodiments extends through a vehicle wheel and continuously maintains air pressure in at least one tire. The ability to provide bi-directional airflow and pressure maintenance in tires as they rotate and operate to suspend a load allows a vehicle to enjoy prescribed engagement with a road, which can increase fuel efficiency, heighten equipment performance, and decrease risk of tire failure over time.

Figure 1:
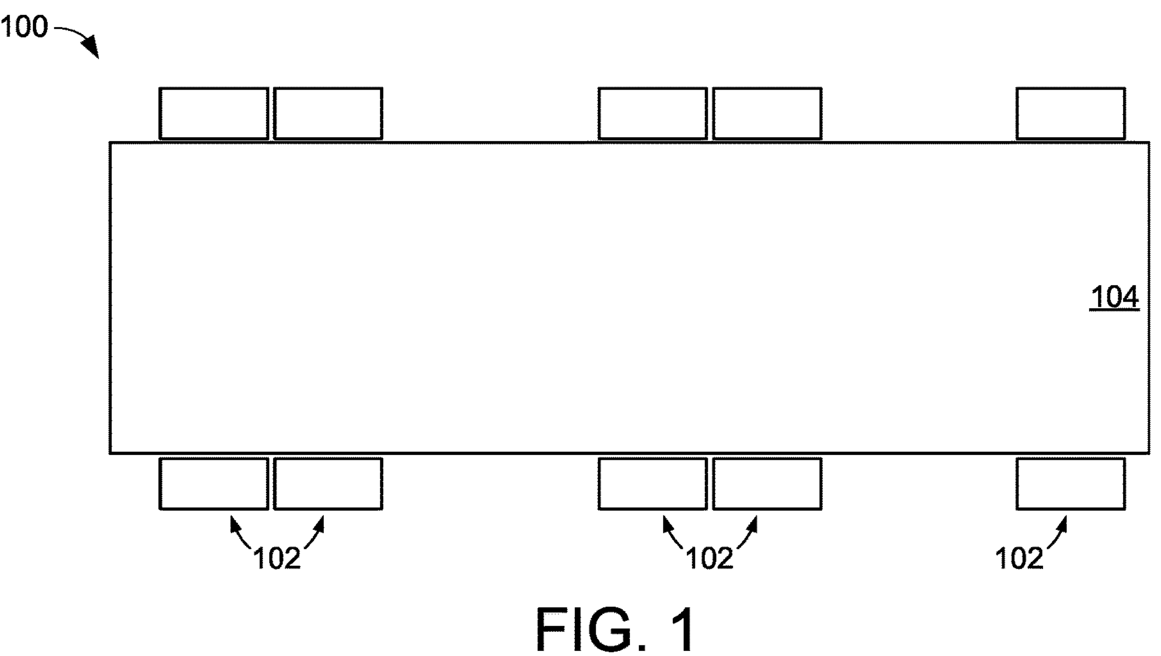
FIG. 1 conveys a block representation of portions of an example inflation environment 100 in which assorted embodiments may be practiced.

Turning to the drawings, FIG. 1 conveys a top view block representation of portions of an example inflation environment 100 in which assorted embodiments may be practiced. Any number of rolling assemblies 102 can be used to physically support a load 104 above ground. While not required or limiting, a rolling assembly 102 can be a combination of a wheel and tire that suspend one or more platforms to allow efficient movement of a load 104 that can consist of at least one unit. Some embodiments of a load 104 include an engine, cabin, hitch, and trailer that utilize multiple separate rolling assemblies 102 that respectively move while distributing the weight of the load 104 to the ground. It is contemplated that the load 104 incorporates a propulsion means, but such is not required or limiting.

Figure 2:
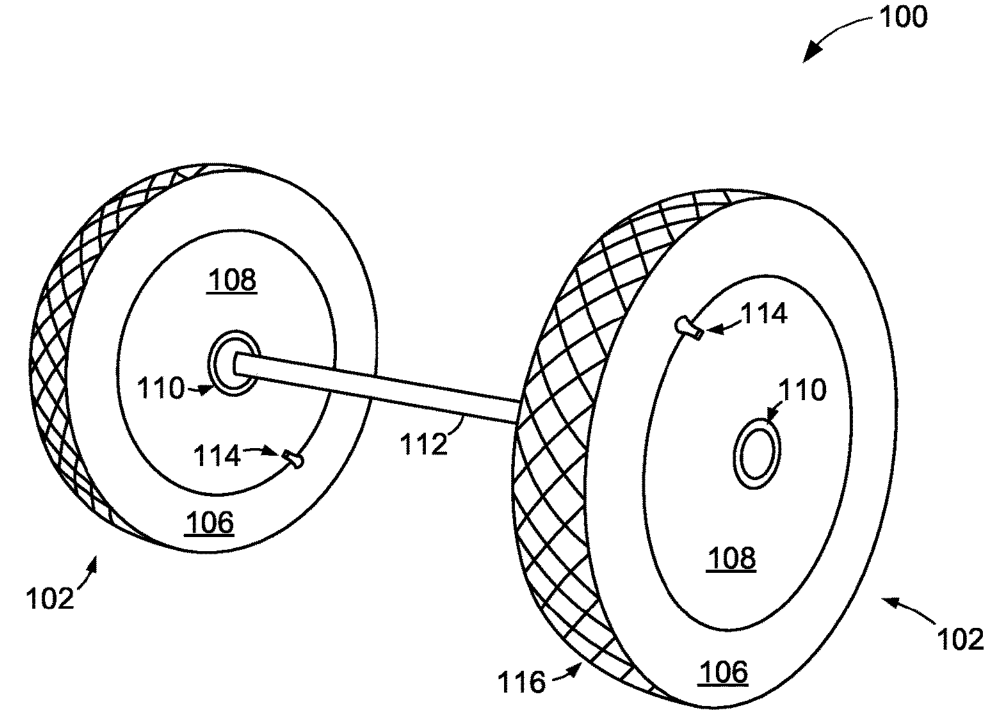
FIG. 2 depicts a line representation of portions of the example inflation environment 100 employing various embodiments of an inflation system.

FIG. 2 depicts example portions of the inflation environment 100 that are arranged in accordance with various embodiments. The environment 100 has a pair of separate rolling assemblies 102 that each consist of an inflatable tire 106 affixed to a rigid wheel 108. Each rolling assembly 102 rotates around a central hub 110 that is connected to an axle 112. Inflation pressure in the tires 106 can be manually measured and manipulated via pin valves 114. The respective tires 106 can be inflated to any pressure with any fluid, such as air or nitrogen. The size, material, tread pattern, and construction of the tires 106 is not limited and can be chosen to match, or be dissimilar, to other tires attached to a load 104 or axle 112.

The axle 112 may be any material, size, and strength to support the respective hubs 110, which may contact multiple separate wheels 108 to distribute weight from a load 104 to the ground. It is contemplated that the axle 112 has a gearbox or other mechanical aspects that transfer energy to the respective wheels 108. However, some embodiments configure the axle 112 as a solid and non-mechanical physical support of the respective hubs 110.

The example arrangement shown in FIG. 2 can provide reliable support and movement of loads across great distances. Yet, the dynamic nature of tire 106 use over time can degrade the reliability of a rolling assembly 102, such as the tire tread 116, and provide sub-optimal rolling performance, which leads to reduced fuel efficiency and weight balancing. For instance, separate tires tire 106 connected to a common load 104, or axle 112, can experience different amounts of wear over time, operate at different temperatures, and have different internal pressures, any of which can contribute to degraded reliability and performance. Thus, embodiments are directed to provide consistent pressure readings in different tires tire 106 operating to support and move a load 104 while mitigating the degradation of tire 106 performance, reliability, and safety.

Figure 3A:
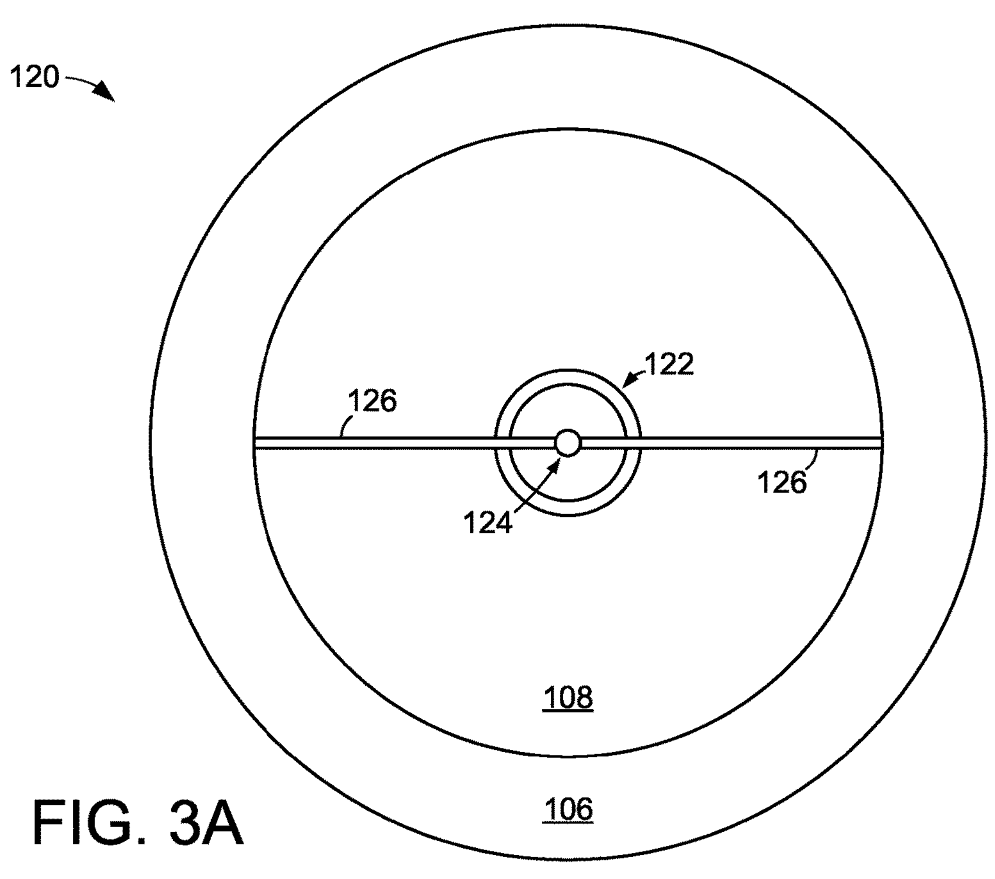
FIGS. 3A and 3B respectively display portions of an example inflation system 120 that may operate to maintain pressure in accordance with some embodiments.
Figure 3B:
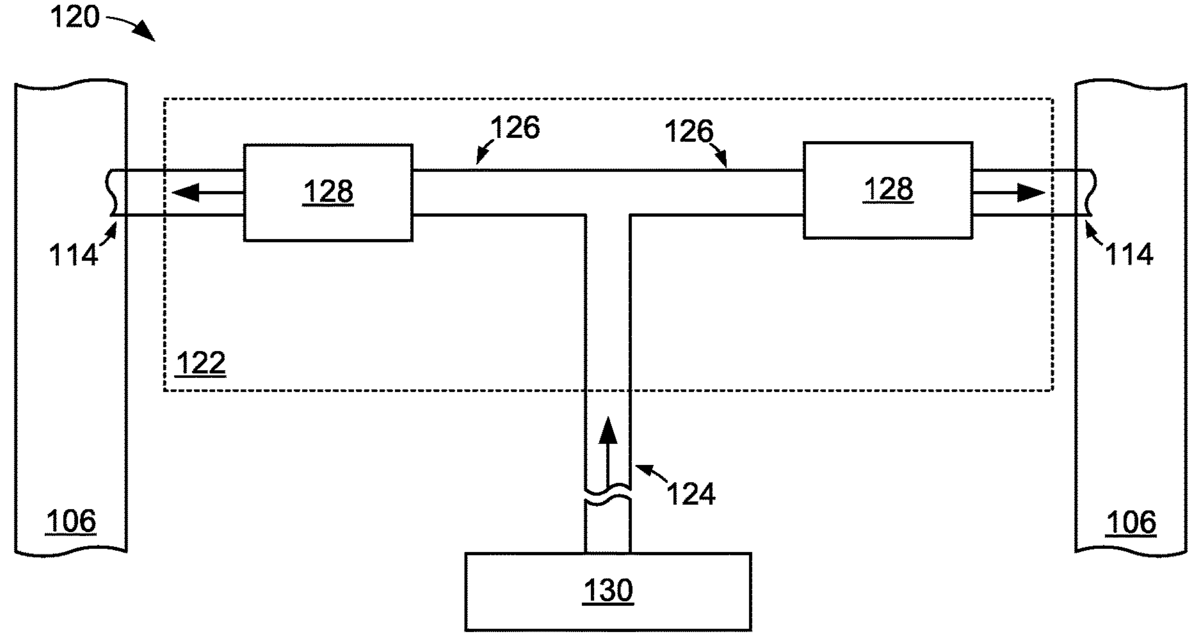

FIGS. 3A and 3B respectively display portions of an example inflation system 120 that may operate to maintain pressure in accordance with some embodiments.

In FIG. 3A, a front view line representation of a rotating assembly 102 is shown with a tire 106 mounted to a wheel 108 that rotates around an inflation hub 122. A supply conduit 124 brings pressurized fluid through the rotary union of the hub 122 with, or without, the wheel 108 and tire 106 rotating. The supply conduit 124, in the example embodiment shown in FIG. 3A, distributes pressurized fluid to lead conduits 126 that are fluidically connected to the tire 106. Although any number of conduits 126 can be employed to send pressurized fluid to any portion of the tire 106.

Despite the supply of pressurized fluid to the tire 106 during tire rotation, the tire 106 may experience degraded operation over time. As an example, the supply of pressurized air may be unidirectional and, as such, over pressurize the tire 106 and degrade performance and efficiency. In the event the delivery of fluid to the tire 106 is electronically controlled, a reliable supply of electrical power is necessary for proper operation, which jeopardizes the safety and performance of a rotating assembly. Some inflation hubs 122 are configured to be selective pressurization systems that contrast constant pressurization systems and can be inactive during times when tire pressurization is needed. It is contemplated that the supply conduit 124 may service a single tire 106, multiple tires 106 on a single axle, or less than all the tires 106 supporting a load, which can result in tire inflation imbalance and degraded overall system efficiency.

FIG. 3B illustrates how a supply conduit 124 provides an airflow pathway to separate valves 128 via lead conduits 126 and pin valves 114. Each valve 128 is not limited to a particular construction, size, type, or operation, but can, in some embodiments, be spring valves that operate against mechanical pressure of one or more spring components to open or close. It is contemplated that the assorted valves 128 can be configured so that different threshold pressures initiate fluid flow into the hub 122 and/or into the tire 106. The ability to create a diverse variety of operating parameters and fluidic conditions with the assorted valves 128 can allow bi-directional flow and maintain a constant pressure in the tire 106.

However, the use of multiple valves 128 to control fluid flow from one or more pressurized fluid sources 130 can present operational difficulties over time. For instance, valves 128 can inadvertently become stuck closed or open for any reason and any duration. Mechanical valves 128 may also wear over time in different ways due to environmental and/or operational variability to produce operating parameters that are different than originally installed and different from other valves 128 of the system. The presence of valves 128 with different operating parameters can lead to non-linear fluid flow and other operational variability that jeopardizes the reliability and proper pressure maintenance in a tire 106. As such, the use of multiple mechanical valves 128 can produce more operational issues than they solve with respect to maintaining a tire 106 at a predetermined pressure despite changes in temperature, humidity, and tire wear over time.

Figures 4, 5A:
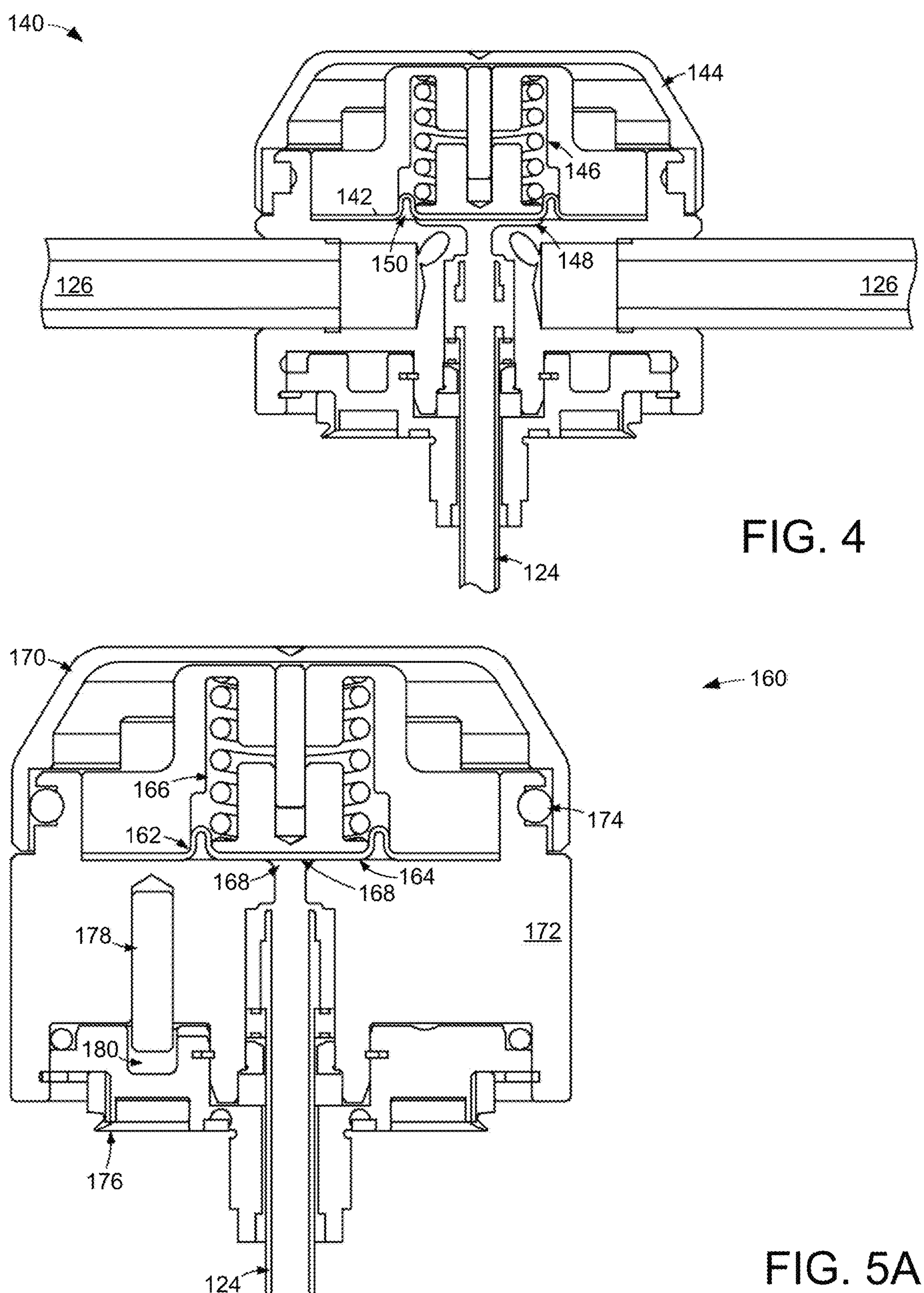
FIG. 4 depicts a line representation of portions of an example dynamic rotary inflation system configured and operated in accordance with various embodiments.
FIGS. 5A and 5B respectively display portions of an example dynamic rotary inflation system 180 arranged in accordance with some embodiments.

As a result of the variety of challenges with providing pressurized fluid to a rotating tire 106, various embodiments are directed at providing bi-directional fluid flow and constant pressure maintenance in a non-electronically controlled system that includes all tires 106 supporting a load. FIG. 4 depicts a cross-sectional line representation of portions of an example dynamic rotary inflation system 140 configured and operated in accordance with various embodiments to provide optimized bi-directional airflow and pressure management over time. A supply conduit 124 is separated from a pair of lead conduits 126 by a single diaphragm 142 that is configured to allow, or restrict, fluid flow in response to tire pressure being below, or above, a predetermined threshold. That is, the diaphragm 142 is constructed and positioned between the supply conduit 124 and lead conduits 126 so that changes in tire pressure over time induces the diaphragm 142 to flex to allow fluid flow into the tire 106 in response to a low tire pressure or flex to allow fluid flow out of the tire 106 in response to a high tire pressure.

Through the use of a diaphragm 142 constructed of a material that is highly resistant to degradation over time due to heat, condensation, and mechanical wear, the inflation hub 144 can provide consistent bi-directional fluid flow that autonomously reacts to changes in tire pressure without electronic activation or monitoring. Hence, the diaphragm 142 can be characterized as a passive component that moves and provide fluid flow without an intervening mechanical or electrical trigger, which contrasts the use of multiple separate valves that have to independently move to allow downstream valve operation and subsequent fluid flow.

It is contemplated that the diaphragm 142 is positioned to provide bi-directional fluid flow without the application of external force. As an example, the diaphragm 142 can be suspended within the hub 144 in a configuration that allows bi-directional flow, and corresponding diaphragm 142 movement, while being free from any bias force. In other embodiments, a bias force is applied to the diaphragm 142 to aid consistent operation. The non-limiting example shown in FIG. 4 illustrates how a mechanical force can be applied via a spring 146 and plunger acting onto the diaphragm 142 to provide a default diaphragm condition and control diaphragm 142 movement in response to changes in tire pressure. It is noted that the application of force onto the diaphragm 142 is not limited to a spring 146 and can be supplemented, or replaced, with magnetic, banded, or solenoid means that consistently apply a predetermined amount of force onto a selected portion of the diaphragm 142. The position of the bias force component in the hub 144 may also allow for efficient adjustment compared to locating the component below the diaphragm 142.

As shown, the diaphragm 142 is suspended over a bowl 148 portion of the supply conduit 124 with a defined lip 150 that is configured to allow sufficient diaphragm 142 movement to provide bi-directional fluid flow without degrading mechanical wear in the diaphragm 142. In contrast, a diaphragm 142 without a defined lip could experience wear over time as a result of cyclic movement that jeopardizes the integrity and seal of the diaphragm 142. Operation of the diaphragm 142 can be complemented by the presence of a supply reservoir bowl 148 at the terminal of the supply conduit 124. That is, an increase in supply conduit 124 diameter proximal the diaphragm 142 can provide a bowl shape that allows fluid to consistently flow in a uniform manner compared to if the supply conduit 124 had a consistent diameter throughout its length to the diaphragm 142.

The configuration of the supply reservoir bowl 148 can further allow for efficient transition between the tire 106 and supply conduit 124. For instance, the shape, size, and position of the reservoir bowl 148 can mitigate circumstances where tire deflation produces condensation that jeopardizes the consistent flow of fluid and maintenance of a predetermined tire pressure. The non-limiting positioning of outlets to the lead conduits 126 from the supply reservoir bowl 148 can allow bi-directional fluid flow with characteristics that correspond with consistent and reliable pressure maintenance. It is noted that the use of a single diaphragm 142 that separates fluid flow from the spring force mechanism 146 works in concert with the configuration of the supply reservoir bowl 148 and fluid outlets that flow into the lead conduits 126 to provide a bi-directional constant pressure maintenance system with less complexity and greater reliability than using multiple mechanical valves that are exposed to fluid flow.

The position and configuration of the hub 144 and diaphragm 142 allow for efficient alteration, maintenance, and replacement over time. For instance, manual manipulation of the hub 144 may change the application of force onto the diaphragm 142 to alter how, and perhaps when, the diaphragm 142 operates without disassembling the hub 144. As another example, the single-piece diaphragm 142 and/or spring 146 may efficiently be inspected and cleaned compared to some valves that are difficult to accurately test. The ability to change the operation of an inflation system 140 by simply replacing a single diaphragm 142 and/or spring 146 provides efficient opportunities for users to change, or repair, tire pressure maintenance, which contrasts systems that employ multiple valves that require properly balanced replacement valves to provide optimal tire pressure maintenance.

Figure 5B:
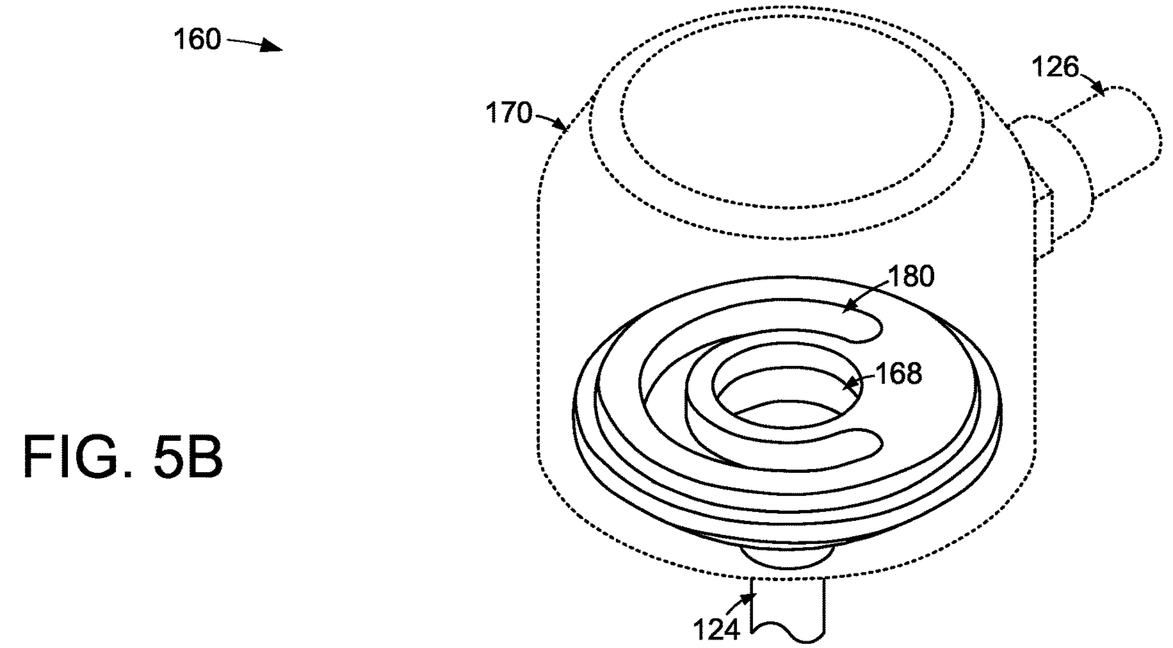

FIGS. 5A and 5B respectively display portions of an example dynamic rotary inflation system 160 arranged in accordance with some embodiments. The cross-sectional line representation of FIG. 5A depicts how an inflation system 160 can provide a single diaphragm 162 sealed against a single sealing surface 164 with a biasing force applied by a biasing mechanism 166. The biasing mechanism 166 can be any type, size, and position relative to the diaphragm 162, such as a mechanical spring, magnetic piston, pneumatic piston, or fluid piston, to apply a predetermined biasing force to seal the supply conduit 124 from each lead conduit 126 until a predetermined fluid pressure differential is experienced that causes portions of the diaphragm 162 to physically move and allow fluid to move between the respective conduits 124/126 via a supply reservoir 168.

The diaphragm 162 and biasing mechanism 166 are each positioned within a hub having an inflation hubcap 170 that is mounted to a hub base 172 that stabilizes the position and integrity of the supply conduit 124. The hub base 172 is sealed to the hubcap 170 via one or more sealing features 174, such as a continuous rubber grommet, O-ring, or laminated structure, to keep debris and dirt from degrading operation and integrity of the biasing mechanism 166. The hub base 172 is not limited in size, structure, or function, but some embodiments affix the hub base 172 to a hub body 176, which can be characterized as a rotary union, that surrounds the supply conduit 124 and allows for rotation of the supply conduit 124 relative to the hub (e.g., the hubcap 170 and hub base 172). For reference, the hub and the rotary union are sometimes collectively referred to as a "hub assembly."

It is noted that the floating nature of the hub base 172 relative to the hub body 176 can pose difficulties in assembling and disassembling the hubcap 170. Accordingly, various embodiments arrange the hub base 172 with a pin 178 that engages a slot 180 in the hub body 176 to allow torque to be transferred to the hub body 176 and the hubcap 170 to be safely and efficiently assembled and disassembled. The pinned engagement of the hub base 172 with the hub body 176 further allows the lead conduits to be properly aligned with the inlets of the tires, such as the valve stems, without undo testing, experimentation, or manipulation of the hubcap 170. That is, the physical engagement of the pin 178 into the slot 180 ensures the depth of the hub base 172 onto the hub body 176 so that lead conduits are correctly positioned to provide bi-directional fluid flow with a tire.

With the perspective view line representation of FIG. 5B, an example configuration of the slot 180 is shown. The slot 180 can be any size, shape, and depth to engage one or more pins 178 to transfer torque force from the hubcap 170 to the hub body 176 and allow assembly and disassembly of the hub base 172 with respect to the hub body 176. For instance, the pinned contact with the hub body 176 allows the hub base 172 to be screwed onto, and off of, the body 176, which provides efficient and safe adjustment, repair, and replacement of the assorted aspects of the hubcap 170 without overtightening. The configuration of the slot 180 can further ensure the position of the lead conduits 126 relative to the supply conduit 124 as well as the valve stems that lead to the tire.

Figure 6:
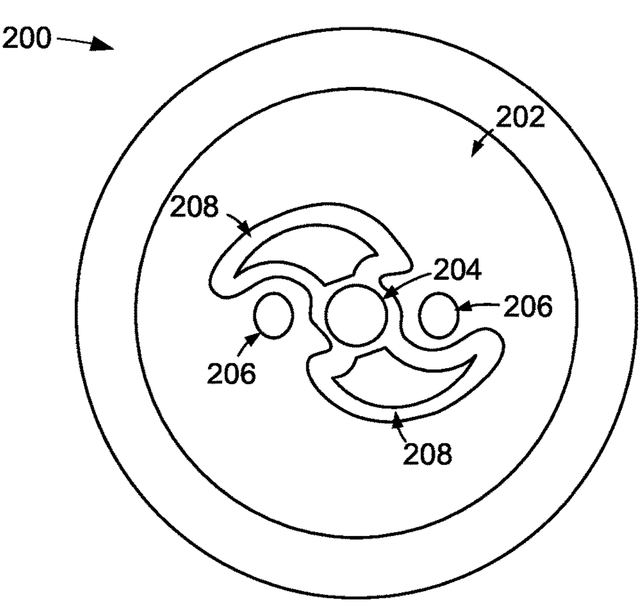
FIG. 6 illustrates portions of an example hub 200 of a dynamic rotary inflation system that may be employed in assorted embodiments.

FIG. 6 illustrates portions of an example hub 200 of a dynamic rotary inflation system that may be employed in assorted embodiments to provide optimized airflow and pressure maintenance over time. The supply reservoir 202 portion of the hub 200 shown in FIG. 6 shows how a supply port 204 is centrally located and flanked by a pair of separate outlets 206 as well as a pair of fluid features 208. Although not required or limiting, each outlet 204 is angled with respect to the longitudinal axis of the hub 200 and positioned proximal and between the recesses of the respective fluid features 208 so that fluid passing between the port 204 and outlets 206 swirls. Such fluid control can provide a practical advantage of forcing any moisture and/or condensation towards the supply port 204, particularly during tire deflation, which can be susceptible to condensation formation.

The ability to remove moisture from the reservoir 202 without filters, members, or components allows for maximum efficiency and simplicity. It is noted that the respective fluid features 208 continuously extend from the supply port 204 with matching shapes and sizes and an axial symmetry about the port 204. Such configuration is not required or limiting as features 208 can be differently shaped, have different depths, consist of a varying depth, have one or more protrusions, or comprise multiple separate recesses to control the flow of fluid within the reservoir 202. In some embodiments, the fluid features 208 act in concert with the angled orientation of the outlets 206 to provide consistently uniform bi-directional fluid flow for a relatively wide range of fluid pressures, which provides maximum efficiency and tire pressure maintenance over time.

Figure 7:
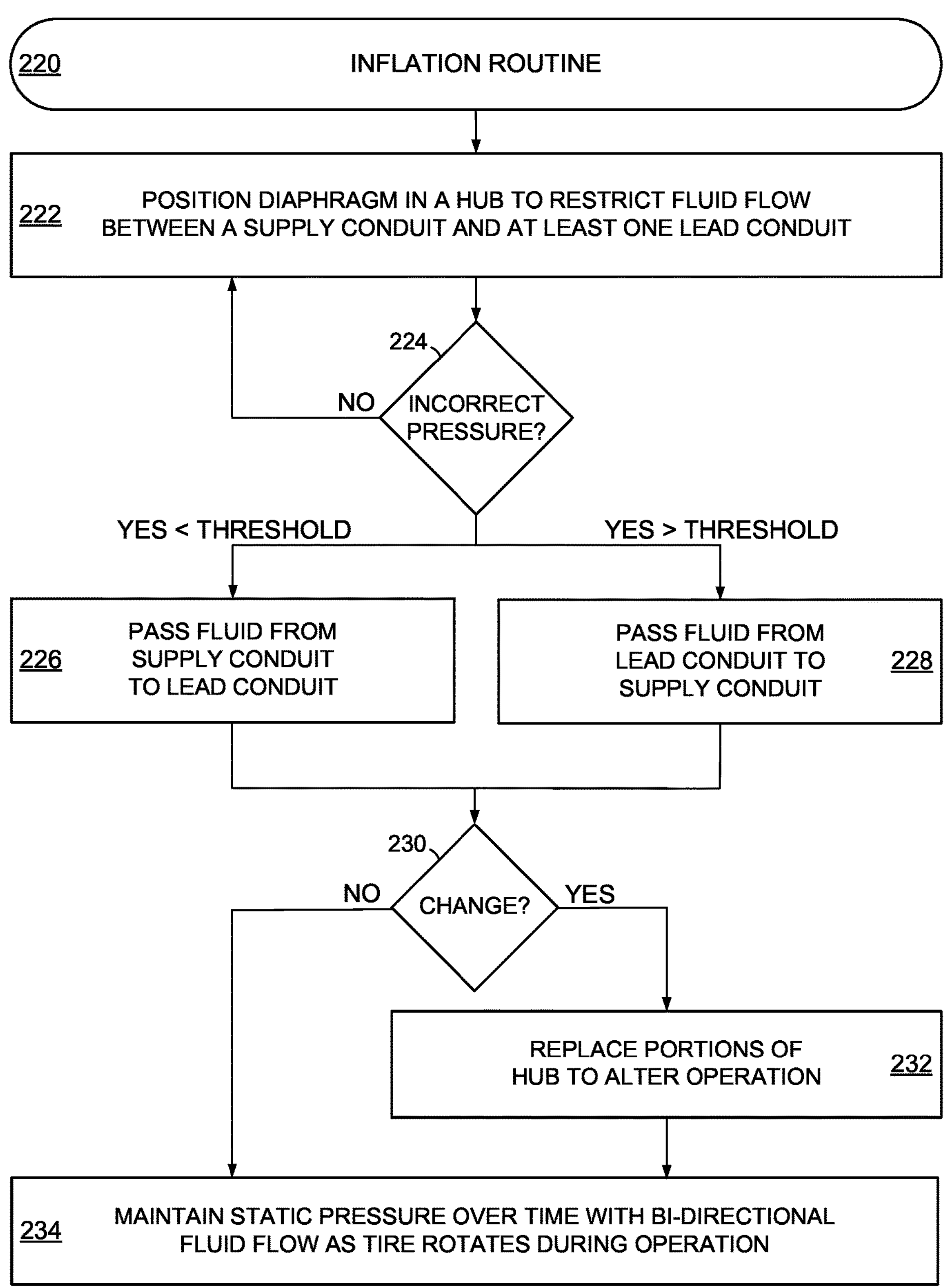
FIG. 7 is an example inflation routine that can be carried out with the respective embodiments of FIGS. 1-6.

FIG. 7 is an example inflation routine 220 that can be conducted with various embodiments of FIGS. 1-6. A diaphragm is initially positioned in a wheel assembly hub in step 222 to restrict fluid flow between a supply conduit and one or more lead conduits. Step 222 can further involve the configuration of a force member, such as a spring or magnet, to set a predetermined bi-directional fluid pressure threshold value, such as 50, 75, or 100 psi. Next, decision 224 evaluates if the tire(s) connected to the lead conduit(s) are at a predetermined pressure. If a tire pressure is below a set threshold, step 226 physically alters portions of the diaphragm to allow fluid to flow into the lead conduits and subsequently into the low pressure tire(s).

If a downstream tire exceeds the desired pressure set point while the fluid pressure in the supply conduit exceeds the threshold pressure maintained by the diaphragm and hub, step 228 physically alters portions of the diaphragm to allow fluid to flow from the lead conduits to the supply conduit, which deflates the connected tire(s) to the predetermined pressure maintained by the diaphragm. Once the fluid pressure at the diaphragm is below the set threshold, the diaphragm returns to a default configuration that seals the supply conduit from each lead conduit. Such return to a default diaphragm configuration will also occur in response to removal of pressure in the supply conduit. It is noted that steps 226 and 228 can be conducted any number of times for any amount of time to maintain a predetermined fluid pressure in one or more tires with bi-directional fluid flow through the hub and diaphragm.

Some embodiments utilize a single diaphragm and hub to supply fluid, and maintain fluid pressure, in multiple separate tires. For instance, a single hub can maintain a set pressure in multiple separate tires each connected to a common diaphragm via lead conduits. Other embodiments arrange individual hubs and diaphragms for separate inflatable members, which allows for different, or uniform, set pressures to be maintained over time in the respective inflatable members. It is contemplated that multiple separate hubs and diaphragms are connected to a single pressurized supply source or multiple separate sources to ensure ample volume and pressure to efficiently maintain a set fluid pressure in each connected member.

Regardless of the number of hubs and diaphragms in a system that employs inflatable tires, decision 230 can evaluate if an operational change to the hub can improve system efficiency, safety, or performance. As an example, decision 230 can evaluate the lifespan of a tire, environmental conditions previously encountered by a tire, known tire wear, current environmental conditions, and operational hub parameters to determine if an adjustment to one or more threshold pressures can increase the life, safety, and/or performance of one or more tires. If an operational adjustment is called for from decision 230, step 232 proceeds to manipulate portions of a selected hub to alter and/or replace aspects to change how bi-directional fluid flows through the diaphragm. It is noted that replacement of a diaphragm or biasing mechanism can be proactive in nature to prevent failure or reactive in nature to manipulate how bi-directional fluid flows through a hub. For instance, a diaphragm with a first default shape, material, thickness, or configuration may be changed with the installation of a new, or additional, diaphragm in step 232, which involves disassembling and subsequently reassembling a hub.

At the conclusion of step 230, or if no adjustment of hub operation is warranted from decision 230, routine 220 advances to step 234 where a desired tire pressure is maintained in each connected tire over time. It is contemplated that step 234 consists of removing pressure from the supply conduit to return the diaphragm to a default position that seals the supply conduit from each lead conduit. Through the operation of routine 220 automatic, bi-directional control of fluid pressure while the member is moving and operating. That is, passing the supply conduit through a rotary union of a wheel assembly allows a diaphragm and hub to immediately and efficiently provide bi-directional fluid flow in response to changes in pressure in a tire. As such, an operator can enjoy automated pressure management over time that provides optimal conditions for safety and performance.

With the various embodiments of an inflation system, a diaphragm is employed to provide optimal pressure management in one or more connected inflation members. The passage of pressurized fluid through a diaphragm with bi-directional flow immediately in response to changes in pressure of an inflatable member connected to a hub allows for precise and efficient control without concern for electronics or operator involvement. The ability to deliver active bi-directional fluid flow through a diaphragm while a wheel is rotating and in operation further supports how optimal pressure management can be employed over time.

What is claimed is:

1. An apparatus comprising:

a supply conduit coupled to a source of pressurized fluid; and a hub assembly comprising a rotary union and a hub, the supply conduit passing through the rotary union to the hub, the hub comprising a diaphragm, a sealing surface, a biasing mechanism, and a lead conduit, the biasing mechanism biased against the sealing surface by the biasing mechanism, the diaphragm separating the supply conduit from the lead conduit, the lead conduit coupled to an inflatable member, the biasing mechanism facilitating bi-directional fluid flow between the supply conduit and the lead conduit in response to a pressure of the pressurized fluid and a predetermined threshold pressure, wherein the supply conduit comprises a supply reservoir proximal the diaphragm, the supply reservoir having a greater cross-sectional diameter than the supply conduit and comprising a pair of outlets and a pair of fluid features, and wherein a longitudinal axis of the supply conduit is positioned between the pair of outlets and the pair of fluid features.

2. The apparatus of claim 1, wherein the inflatable member is a vehicle tire.

3. The apparatus of claim 1, wherein the biasing mechanism comprises a spring.

4. The apparatus of claim 1, wherein the rotary union passes through a vehicle wheel.

5. The apparatus of claim 1, wherein each fluid feature is disposed between the longitudinal axis of the supply conduit and a selected one of the pair of outlets.

6. The apparatus of claim 5, wherein each outlet is angled with respect to the longitudinal axis of the supply conduit.

7. The apparatus of claim 5, wherein each fluid feature comprises a recess with a curvilinearly extending shape to direct fluid passing from a selected outlet to the supply conduit.

8. The apparatus of claim 1, wherein the pair of outlets and the pair of fluid features are collectively arranged in axial symmetry about the longitudinal axis of the supply conduit.

9. The apparatus of claim 1, wherein the rotary union comprises a slot and the hub comprises a pin positioned to engage the slot.

10. The apparatus of claim 9, wherein the slot is configured to position the hub so that the lead conduit is aligned with a valve stem of the inflatable member.

11. A method comprising:

connecting a tire to a hub using a lead conduit;

setting the hub to a first threshold pressure;

pressurizing a supply conduit to a predetermined fluid pressure, the supply conduit passing through a rotary union to the hub, the hub comprising a diaphragm, a sealing surface, and a biasing mechanism, the supply conduit separated from the lead conduit by the diaphragm, the rotary union coupled to the hub using a pin that extends into a circumferentially extending slot;

flowing fluid from the supply conduit to the tire in response to fluid pressure in the tire dropping below the first threshold pressure and moving the diaphragm with respect to the sealing surface; and flowing fluid from the tire to the supply conduit in response to fluid pressure in the tire elevating above the first threshold pressure and moving the diaphragm with respect to the sealing surface.

12. The method of claim 11, further comprising adjusting the predetermined fluid pressure by manipulating the hub, the adjusting of the predetermined fluid pressure lowering the pressure at which the diaphragm flexes to allow fluid flow between the supply conduit and the first lead conduit.

13. The method of claim 11, further comprising disassembling the hub and subsequently assembling the hub after replacing the diaphragm.

14. The method of claim 11, wherein the slot extends into the rotary union, the pin extends from the hub, and the hub is rotated relative to the rotary union to align the tire with the hub.

15. The method of claim 11, wherein the supply conduit is fluidly connected to multiple separate tires using separate lead conduits.

16. The method of claim 11, wherein the hub is a first hub of a vehicle, and the method further comprises connecting the supply conduit to a second hub.

17. An apparatus, comprising:

a supply conduit coupled to a source of pressurized fluid; and a hub assembly comprising a rotary union and a hub, the supply conduit passing through the rotary union to the hub, the hub comprising a diaphragm, a sealing surface and a biasing mechanism, the diaphragm biased against the sealing surface by the biasing mechanism, the diaphragm separating the supply conduit from a lead conduit which extends from the hub to an inflatable member, the biasing mechanism facilitating bi-directional fluid flow between the supply conduit and the lead conduit in response to a pressure of the pressurized fluid and a predetermined threshold pressure, the rotary union coupled to the hub using a pin that extends into a circumferentially extending slot to facilitate rotational alignment of the hub with a port of the inflatable member.

18. The apparatus of claim 17, wherein the pin extends from the hub and the circumferentially extending slot extends into the rotary union.

19. The apparatus of claim 1, wherein the supply conduit is axially aligned with a central rotation axis of the inflatable member, and wherein the lead conduit extends radially away from the central rotation axis in a direction toward the inflatable member.

20. The apparatus of claim 1, wherein the supply conduit is cylindrically shaped with a first outermost diameter along a portion that passes through the rotary union and terminates at a supply reservoir in facing relation to the diaphragm having a second outermost diameter larger than the first outermost diameter.

* * * * *